US006629220B1

United States Patent
Dyer

(10) Patent No.: US 6,629,220 B1
(45) Date of Patent: Sep. 30, 2003

(54) METHOD AND APPARATUS FOR DYNAMIC ARBITRATION BETWEEN A FIRST QUEUE AND A SECOND QUEUE BASED ON A HIGH PRIORITY TRANSACTION TYPE

(75) Inventor: Russell W. Dyer, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/372,147

(22) Filed: Aug. 20, 1999

(51) Int. Cl.[7] .............................................. G06F 12/00
(52) U.S. Cl. ...................... 711/158; 711/151; 711/105; 711/163; 710/240; 710/244; 710/220
(58) Field of Search ........................ 71/151, 158, 150, 71/105, 169, 163, 152, 154; 710/107–112, 113, 116, 123, 110, 240–244, 220, 226

(56) References Cited

U.S. PATENT DOCUMENTS

| | | | | |
|---|---|---|---|---|
| 5,506,972 A | * | 4/1996 | Heath et al. ................. | 710/113 |
| 5,560,016 A | * | 9/1996 | Fiebrich et al. ............. | 710/240 |
| 5,619,661 A | * | 4/1997 | Crews et al. ................ | 710/119 |
| 5,623,672 A | * | 4/1997 | Popat .......................... | 710/240 |
| 5,740,383 A | * | 4/1998 | Nally et al. .................. | 345/535 |
| 5,742,847 A | * | 4/1998 | Knoll et al. .................. | 710/16 |
| 5,745,732 A | * | 4/1998 | Cherukuri et al. ............ | 710/20 |
| 5,754,800 A | * | 5/1998 | Lentz et al. ................. | 710/116 |
| 5,758,105 A | * | 5/1998 | Kelley et al. ............... | 710/113 |
| 5,778,200 A | * | 7/1998 | Gulick ........................ | 710/113 |
| 5,802,571 A | * | 9/1998 | Konigsburg et al. ........ | 711/143 |
| 5,805,840 A | * | 9/1998 | Dutton ........................ | 710/116 |
| 5,884,051 A | * | 3/1999 | Schaffer et al. ............. | 710/107 |
| 5,933,611 A | * | 8/1999 | Shakkarwar ................ | 710/126 |
| 5,948,081 A | * | 9/1999 | Foster ......................... | 710/25 |
| 6,092,158 A | * | 7/2000 | Harriman et al. ........... | 710/240 |
| 6,105,094 A | * | 8/2000 | Lindeman ................... | 710/107 |
| 6,119,190 A | * | 9/2000 | Garney ....................... | 710/127 |
| 6,122,676 A | * | 9/2000 | Brief et al. .................... | 710/9 |
| 6,134,625 A | * | 10/2000 | Abramson ................... | 710/241 |
| 6,148,357 A | * | 11/2000 | Gulick et al. ............... | 710/107 |
| 6,173,378 B1 | * | 1/2001 | Rozario et al. .......... | 365/230.05 |
| 6,266,702 B1 | * | 7/2001 | Darnell et al. .............. | 710/105 |
| 6,279,087 B1 | * | 8/2001 | Melo et al. .................. | 710/310 |
| 6,286,083 B1 | * | 9/2001 | Chin et al. ................... | 710/116 |
| 6,330,646 B1 | * | 12/2001 | Clohset et al. .............. | 711/151 |
| 6,345,345 B1 | * | 2/2002 | Yu et al. ..................... | 710/116 |
| 6,351,783 B1 | * | 2/2002 | Garney et al. .............. | 710/107 |
| 6,385,671 B1 | * | 5/2002 | Hunsaker et al. ........... | 370/300 |
| 6,421,751 B1 | * | 7/2002 | Gulick ........................ | 710/107 |

OTHER PUBLICATIONS

Andrew S. Tanenbaum, "Modern Operating Systems", Prentice Hall, Inc, pp. 61–71, 1992.*

* cited by examiner

Primary Examiner—Hong Kim
(74) Attorney, Agent, or Firm—Cynthia T. Faatz

(57) ABSTRACT

Dynamic arbitration based on a high priority transaction type. A first memory access request is received at a first request queue. If the first memory access request is of a first type, the priority of the first request queue is dynamically raised over the priority of a second request queue. The priority of the second request queue is dynamically raised over that of the first request queue when requests of the first type in the first request queue, up to a maximum predetermined number of requests, have been serviced.

29 Claims, 3 Drawing Sheets

US 6,629,220 B1

METHOD AND APPARATUS FOR DYNAMIC ARBITRATION BETWEEN A FIRST QUEUE AND A SECOND QUEUE BASED ON A HIGH PRIORITY TRANSACTION TYPE

BACKGROUND

1. Field

An embodiment of the present invention relates to the field of managing memory transactions, and more specifically, to dynamic arbitration of memory access requests based on a high priority transaction type.

2. Discussion of Related Art

Certain types of memory-related transactions require low latency access to system resources for proper operation of associated devices.

For example, a Universal Serial Bus (USB) provides a low cost attachment approach for video cameras, printers and other types of devices. Cost is reduced as compared to prior peripheral buses because USB data is moved at relatively regular intervals reducing the need for buffering. If USB data is not stored or read from memory at the expected interval(s), however, data may be dropped and, as a result, the quality of the corresponding peripheral device input or output data may be compromised. Because of the regular intervals at which they are to be serviced, USB transactions are referred to as isochronous transactions.

In multi-port, concurrent and deeply pipelined systems, such isochronous transactions (USB transactions are just one example) can encounter significant delay due to static arbitration. Static arbitration uses timeslicing, or another similar approach, to alternately process transactions from multiple transaction queues or pipes in a predictable manner. Static arbitration can cause unacceptable delays in processing of isochronous or other real-time transactions. This is because there may be several asynchronous transactions ahead of the isochronous transaction(s) in the transaction queue(s). Further, there may be multiple arbitration points for the transactions to traverse, each of which may favor a prior asynchronous transaction.

For some systems, to partially address this issue for accelerated graphics port (AGP) data specifically, there is an AGP expedite instruction. The AGP expedite instruction causes an arbiter near the AGP to choose to process only AGP-related instructions. In this manner, AGP-related transactions can be prioritized over other types of transactions such that the quality of the output from, or input to, AGP devices is maintained at an acceptable level.

This approach has a drawback, however, in that, through use of the AGP expedite instruction, AGP-related transactions can dominate the system to the exclusion of other types of transactions. In this manner, using the AGP expedite instruction may result in some non-AGP components being starved of data. Further, the AGP expedite instruction only moves similar types of cycles (i.e. only similar types of graphics instructions). For systems that execute other types of high priority transactions, such as real-time or isochronous transactions, the AGP expedite instruction may not be helpful.

SUMMARY OF THE INVENTION

A method and apparatus for dynamic arbitration based on a high priority transaction type are described.

In accordance with one embodiment, a method for arbitrating memory access requests includes receiving a first memory access request at a first request queue and dynamically raising the priority of the first request queue over a second request queue if the first memory access request is of a first type. When requests of the first type in the first request queue, up to a maximum predetermined number of requests, have been serviced, the priority of the second request queue is dynamically raised over that of the first request queue.

Other features and advantages of the present invention will be appreciated from the accompanying drawings and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

A method and apparatus for dynamic arbitration based on a high priority transaction type are described. In the following description, particular types of memory access requests and particular types of integrated circuit devices are described for purposes of illustration. It will be appreciated, however, that other embodiments are applicable to other transaction types and to other types of integrated circuit devices.

Figure 1:
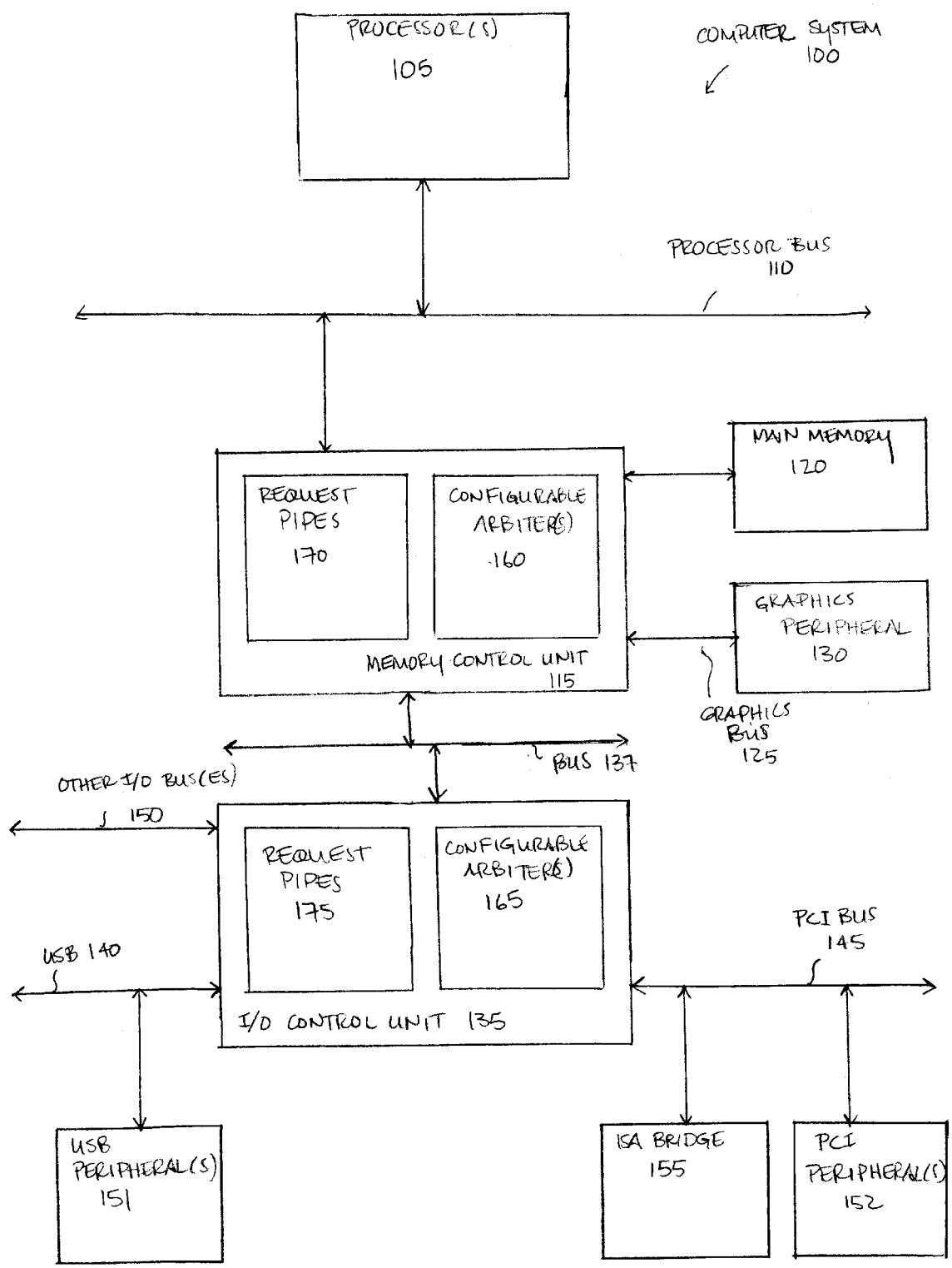
FIG. 1 is a block diagram of a computer system that may be used for one embodiment.

FIG. 1 is a block diagram of a system 100 that may be advantageously used for one embodiment. The system 100 is a computer system, but may be another type of system for other embodiments. The computer system 100 of FIG. 1 includes one or more processors 105 coupled to a processor bus 110. A memory control unit 115, which may alternately be referred to as a memory control hub, is coupled to the processor bus 110 to manage instructions and data associated with a main memory 120.

The main memory 120 is coupled to the memory control unit 115 to store instructions and information for use by the processor(s) 105 and other integrated circuit devices in the system 100. The main memory 120 of one embodiment comprises Rambus® dynamic random access memory (RDRAM®), but may include other types of memory, such as synchronous dynamic random access memory (SDRAM) or double data rate SDRAM (DDR), for alternative embodiments. (Rambus and RDRAM are registered trademarks of Rambus, Inc. of Mountain View, Calif.).

A graphics bus 125, such as an accelerated graphics port (AGP) bus, for example, is also coupled to the memory control unit 115. One or more graphics peripheral(s) 130 may be coupled to the graphics bus 125. Other types of graphics buses may also be used for alternative embodiments.

An input/output (I/O) control unit 135, alternately referred to herein as an input/output control hub, is coupled to the memory control unit 115 over a bus 137 and operates to control input/output requests for the computer system 100. For one embodiment, the bus 137 is a hub interface designed by Intel Corporation, the assignee of the present invention. An example of a hub interface is described in a copending U.S. Patent application entitled "Method and Apparatus for an Improved Interface Between Computer Components," Ser. No. 09/186,219, filed Nov. 3, 1998. For other embodiments, the bus 137 may be another type of bus that provides for a memory access request type indication corresponding to a memory access request to be communicated over the bus 137 as described in more detail below.

One or more input/output (I/O) buses, such as a universal serial bus (USB) 140, and/or a peripheral component interconnect (PCI) bus 145 and/or other I/O buses 150 and associated peripheral(s) 151 and 152, may be coupled to the input/output control unit 135. The other I/O bus(es) 150 may include a bus in accordance with the Audio Codec '97 (AC'97) Specification version 2.1 (or another version) published by Intel Corporation and/or a bus in accordance with the IEEE 1394 Standard for a High Performance Serial Bus—1995 (1394), for example. An industry standard architecture (ISA) bus bridge 155 may also be coupled to the PCI bus 145 or another I/O bus for one embodiment.

With continuing reference to FIG. 1, each of the memory control unit 115 and the I/O control unit 135 include configurable arbiters 160 and 165, respectively, and request pipes or portions of request pipes 170 and 175, respectively.

It will be appreciated that other types of systems configured in another manner are also within the scope of various embodiments.

Figure 2:
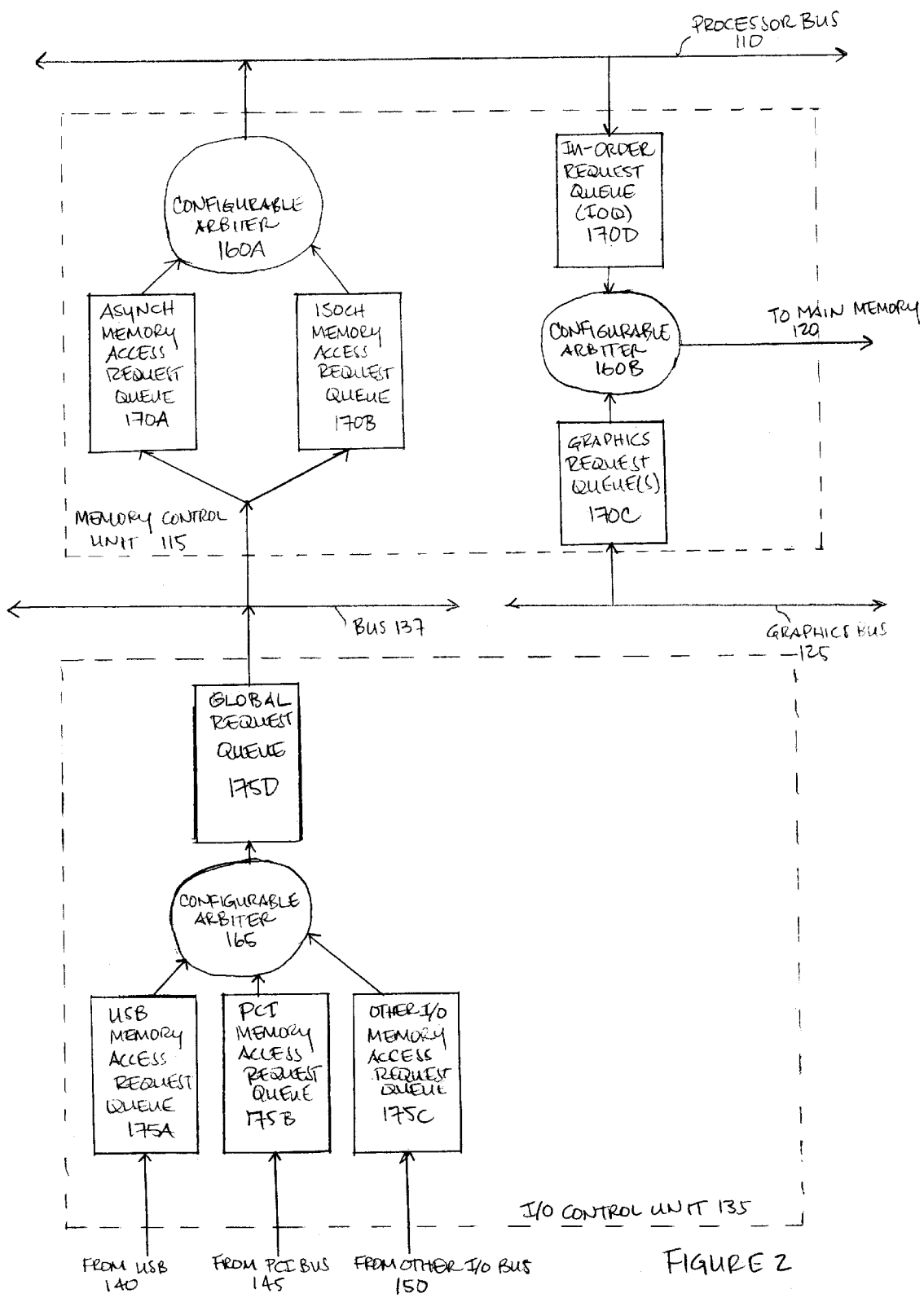
FIG. 2 is a block diagram showing the memory control unit and I/O control unit of FIG. 1 in more detail.

FIG. 2 shows the I/O control unit 135 and the memory control unit 115 in more detail. As shown, the I/O control unit 135 includes memory access request queues 175A, 175B and 175C, each of which is included in request pipes 175 in FIG. 1. Memory access request queues 175A, 175B and 175C are coupled to receive memory access requests from the I/O buses 140, 145 and 150 (FIG. 1), respectively.

For this embodiment, each source of memory access requests (i.e. buses 140, 145 and 150 in this example) is associated with a memory access request queue in the I/O control unit 135. For other embodiments, a single memory access request queue may be coupled to receive memory access requests from multiple sources and/or multiple request queues may be provided for a single request source.

The memory access request queues 175A, 175B and 175C are also each coupled to a first configurable arbiter 165. The configurable arbiter 165 determines from which of the memory access request queues 175A, 175B or 175C the next pending memory access request will be transferred to a global request queue 175D. The order of memory access requests in the global request queue 175D is the order in which memory access requests are transferred from the I/O control unit 135 to the memory control unit 115 over the bus 137. The operation of the memory access request queues 175A, 175B and 175C and the configurable arbiter 165 is described in more detail below.

The memory control unit 115 includes an asynchronous (or asynch) memory access request queue 170A and an isochronous (or isoch) memory access request queue 170B. Each of the asynchronous and isochronous request queues 170A and 170B are part of the request pipes 170 shown in FIG. 1.

The asynchronous memory access request queue 170A and the isochronous memory access request queue 170B are both coupled to a second configurable arbiter 160A. The configurable arbiter 160A determines from which of the request queues 170A or 170B, the next request is to be transferred to the processor bus 110.

The memory control unit 115 also includes one or more graphics request queues 170C (also part of the request pipes 170 in FIG. 1) coupled to the graphics bus 125. The graphics request queue(s) 170C temporarily stores all memory access requests from the graphics bus 125 destined for the main memory 120. If the graphics bus 125 is an AGP bus, for example, all AGP memory access requests will be temporarily stored in the graphics request queue(s) 170C.

The graphics request queue(s) 170C is coupled to a third configurable arbiter 160B. The third configurable arbiter 160B is also coupled to one or more in-order request queues (IOQs) 170D. The IOQ(s) 170D receive memory access requests over the processor bus 110 and temporarily store them in the order they were received from the processor bus 110. The configurable arbiter 160B determines whether a pending memory access request in the graphics request queue(s) 170C or a pending memory access request in the IOQ(s) 170D is to be serviced next.

The term "serviced" as used herein in reference to a memory access request may refer to the traditional meaning of the term, (i.e. the action indicated in the memory access request has been taken). Additionally, the term "serviced" is used herein to indicate that a memory access request at a particular arbitration point has been transferred to an adjacent bus or otherwise moved forward in the memory access request processing pipeline.

It will be appreciated that the I/O control unit 135 and the memory control unit 115 may each include other types of circuits not shown in FIG. 2. Additionally, the I/O control unit 135 and the memory control unit 115 may each include different numbers of queues and/or arbiters, or may otherwise be configured in a different manner than that shown in FIG. 2.

Referring to FIGS. 1 and 2, in operation, memory access requests from the buses 140, 145 and/or 150 are received at the I/O control unit 135 and stored in the corresponding memory request queues 175A, 175B and/or 175C, respectively. The I/O control unit 135 then identifies each of the requests as being an asynchronous memory access request type or an isochronous memory access request type.

For one embodiment, the memory access request type is determined by the source of the memory access request. Memory access requests originating from devices coupled to USB, AC'97 and 1394 buses, for example, are all isochronous requests based on their corresponding bus protocols, while memory access requests from PCI and ISA buses are each asynchronous requests. As described above, isochronous memory access requests are requests that should be serviced at relatively regular and predictable intervals in order to maintain output and/or input quality. In contrast, asynchronous memory access requests may be serviced at more irregular intervals.

For purposes of example, it is assumed that the other I/O bus(es) 150 comprises an AC'97 bus. For this example then, the memory access request queues 175A and 175C store isochronous memory access requests while the memory access request queue 175B stores asynchronous memory access requests. For other embodiments, the memory access request type may be determined by other factors such as the particular device originating the request rather than the bus over which the request is communicated.

For some embodiments, the type of memory access request may be indicated by setting (or not setting) one or more bits within the memory access request. For example, for one embodiment, an isochronous tag may be set for each isochronous memory access request as it is stored in the respective memory access request queue 175A or 175C. Such a tag may not be included for asynchronous memory access requests.

For such embodiments, the bus 137 protocol is designed with the extra tag bit(s) in mind such that the request type indication corresponding to a particular memory access request is communicated over the bus 137 along with the request. Other approaches to indicating the type of memory access request are also within the scope of various embodiments. Further, there may be more than two memory access request types for some embodiments such that additional type identification bits may be used.

For example, the I/O control unit 135 may receive two memory access requests concurrently: one from the USB 140, and one from the PCI bus 145. In this example, the isochronous memory access request from the USB 140 is temporarily stored in the memory access request queue 175A while the asynchronous memory access request from the PCI bus 145 is temporarily stored in the memory access request queue 175B. As discussed above, the I/O control unit 135 identifies the memory access request from the USB 140 as an isochronous memory access request by setting an isochronous tag in the request.

Upon temporarily storing the isochronous memory access request in the request queue 175A, the arbiter 165 is dynamically configured to raise the priority of the memory access request queue 175A over that of the request queue 175B. The phrase "raising the priority" is used herein to indicate that the relative priority of two queues or pipes are changed with respect to each other such that relative priority of the indicated pipe or queue is higher than another pipe or queue. Raising the priority of a first pipe or queue may be accomplished by lowering the priority of a second pipe or queue, for example. Other approaches to changing the relative priority of pipes and/or queues to achieve the desired result are within the scope of various embodiments.

By raising the priority of the memory access request queue 175A over that of the request queue 175B, the isochronous request in the queue 175A is transferred to the global request queue 175D before the asynchronous request in the queue 175B, even though the asynchronous request was received at the same time.

Once the isochronous request has been transferred to the global request queue 175D, the arbiter 165 is dynamically reconfigured to raise the priority of the request queue 175B over that of the request queue 175A such that the pending asynchronous request is then transferred to the global request queue 175D.

For one embodiment, the configurable arbiter 165 assigns equal priority to the queues 175B and 175C while isochronous requests are prioritized. For this embodiment, if there are request(s) pending in both queues, the pending requests are alternately transferred from the queues 175B and 175C to the global request queue 175D. For one embodiment, the pending requests may be transferred one at a time from the queues 175B and 175C. Alternatively, a given number of requests may be transferred from the queue 175B and then from the queue 175C.

Where there are multiple requests pending in one or more of the queues 175A, 175B and 175C, the arbiter 165 is dynamically configured to prioritize isochronous request(s) over asynchronous request(s) until: 1) all isochronous requests have been transferred to the global request queue 170D, or 2) a first predetermined maximum number (n) of isochronous requests have been transferred, whichever occurs first.

The first predetermined maximum number n may be selected based on several factors including the allowable latency for isochronous requests, desired memory access bandwidth, etc. For one embodiment, the first predetermined number n is programmable and may be adjusted after manufacture of the I/O control unit 135.

Upon the occurrence of one of the above conditions, the arbiter 165 is reconfigured to prioritize the queue 175B that temporarily stores asynchronous memory access requests from the PCI bus 145. Once one asynchronous request is transferred from the queue 175B to the global request queue 175D, the configurable arbiter 165 is again reconfigured to prioritize isochronous transactions until one of the above conditions is met.

Using this approach, pending isochronous memory access requests may be pushed ahead of co-pending asynchronous requests in the request pipes 175 to potentially reduce isochronous request latency without starving sources of asynchronous memory access requests.

It will be appreciated that, while one asynchronous request is transferred to the global request queue 175D for every n isochronous requests in the example above, for other embodiments, a larger number of asynchronous requests may be transferred while the queue 175B is prioritized by the arbiter 165. The number of asynchronous requests to be transferred between isochronous request transfer cycles may also be programmable for some embodiments.

Isoch and asynch memory access requests transferred to the global request queue 175D are then transferred in order to the memory control unit 115 over the bus 137. As the memory control unit 115 receives the memory access requests from the bus 137, they are each stored in one of the memory access request queues 170A or 170B. For one embodiment, all asynchronous memory access requests are temporarily stored in the asynch memory access request queue 170A while all isochronous memory access requests, and their associated isoch tags, are stored in the isoch memory access request queue 170B.

When one or more isochronous memory access requests are pending in the isoch memory access request queue 170B, the configurable arbiter 160A is dynamically configured in a similar manner to the configurable arbiter 165 to raise the arbitration priority of the isoch queue 170B above that of the asynch queue 170A. In this manner, pending isochronous memory access requests may be transferred to the processor bus 110 ahead of co-pending asynchronous memory access requests even where the co-pending asynch requests were received before the isoch requests being transferred.

Again, in order to avoid starving devices that generate asynchronous memory access requests, the configurable arbiter 160A of one embodiment only prioritizes the isoch queue 170B above the asynch queue 170A until: 1) all isochronous requests in the queue 170B have been transferred to the bus 110 or 2) until a second predetermined number of isochronous memory access requests have been transferred to the processor bus 110, whichever event occurs first.

For one embodiment, for example, the second predetermined number is eight. Once eight isochronous memory access requests have been successively transferred to the processor bus 110 from the isoch request queue 170B, the configurable arbiter 160A is dynamically configured to prioritize the asynch queue 170A to allow one asynchronous memory access request to be transferred to the processor bus 110.

Once the one asynchronous memory access request has been transferred to the processor bus 110, the configurable arbiter 160A is again dynamically configured to prioritize the isochronous queue 170B until another eight isochronous memory access request have been transferred.

The second predetermined maximum number and/or the number of asynchronous requests transferred between isochronous request transfers may also be programmable and may be set after manufacture of the memory control unit 115. Further, the second predetermined maximum number may be the same or different from the first predetermined maximum number for various embodiments, and may be determined based on similar considerations.

Memory access requests transferred to the processor bus 110 from the memory control unit 115 and/or the processor(s) 105 are then transferred to the memory control unit 115. The transferred memory access requests are temporarily stored in the order they were received from the bus 110 in the in-order request queue(s) (IOQ(s)) 170D.

When an isochronous memory access request is stored in the IOQ(s) 170D, the corresponding isoch tag is stored along with the request. For one embodiment, storing of the isoch tag indicating an isoch request causes all asynchronous memory access requests ahead of the indicated isoch request in the IOQ(s) 170D to be promoted to isochronous requests. In this manner, isochronous requests behind asynchronous requests in the IOQ(s) can be processed more quickly while still maintaining the requests in order in the IOQ(s) 170D.

For one embodiment, all isoch tags corresponding to memory access requests stored in the IOQ(s) 170D are logically OR'd together such that any isochronous memory access request in the IOQ(s) 170D is seen by the arbiter 160B. When one or more isochronous memory access requests are pending in the IOQ(s) 170D, the arbiter 160B (which may typically use a static timeslicing approach) will be dynamically configured to raise the priority of the IOQ(s) 170D above that of the graphics request queue(s) 170C. In this manner, isochronous requests may be serviced more quickly. For one embodiment, the arbiter 160B is dynamically configured to prioritize the IOQ(s) 170D until: 1) all isochronous requests in the IOQ 170D have been serviced, or 2) a third predetermined number of slices from the IOQs 170D have been serviced, whichever occurs first.

For one embodiment, a slice includes at least four memory access requests and may include as many as 256 memory access requests. For other embodiments, a slice may include a different number of requests. The desired slice size for a particular memory control unit or computer system configuration may be selected based on many considerations and may be programmable.

For one embodiment, the third predetermined number is 16, but other numbers may be used for other embodiments. The third number, like the first and second numbers may be determined based on a number of factors including characteristics of the graphics bus 125, maximum allowed latency for isochronous requests, etc. The third predetermined number may or may not be the same as the first or second predetermined numbers discussed above and may, like the first and second numbers, also be programmable.

In the manner described above, by dynamically configuring arbiters at various arbitration points in a request pipe in response to detecting an isochronous request, the latency involved in servicing the isochronous request can be reduced as compared to prior approaches. A request pipe in this context includes all of the various request queues and intermediate logic between the source of a memory access request and its destination, i.e. main memory 120. Further, by only allowing a predetermined number of isochronous memory access requests to be prioritized at each arbitration point before one or more asynchronous requests are serviced, the described approach reduces the risk of starving devices that generate asynchronous requests.

It will be appreciated that while isochronous and asynchronous transactions have been described above, other embodiments are applicable to different types of transactions. In another embodiment, for example, one or more other high priority transaction types may be prioritized by configurable arbiter(s) in a similar manner.

Figure 3:
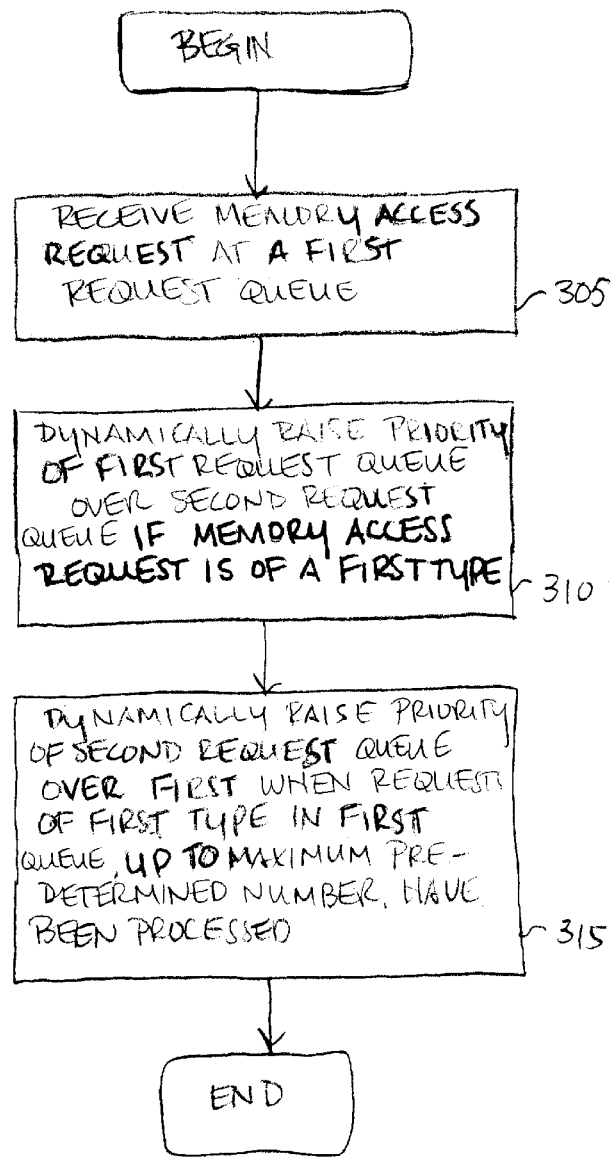
FIG. 3 is a flow diagram showing the arbitration method of one embodiment.

Referring now to FIG. 3, the arbitration method of one embodiment is described in more detail.

At block 305, a memory access request is received at a first request queue. At block 310, if the memory access request is a first type of memory access request, the priority of the first request queue is dynamically raised above that of a second request queue. The priority of the second request queue is then dynamically raised above that of the first request queue at block 315 when requests of the first type in the first queue, up to a maximum predetermined number of requests, have been processed.

It will be appreciated that, for other embodiments, additional actions may be included such as processing a request of a second type and then dynamically reconfiguring the arbiter to again raise the priority of the first queue above that of the second queue.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for arbitrating memory access requests, the method comprising:

receiving a first memory access request at a first request queue;

dynamically raising the priority of the first request queue over a second request queue if the first memory access request is of a first type; and dynamically raising the priority of the second request queue over the first request queue before all requests of the first type in the first request queue have been serviced in response to a predetermined maximum number of requests of the first type being serviced.

2. The method of claim 1 further comprising dynamically raising the priority of the first request queue over the second request queue after a request of a second type has been serviced.

3. The method of claim 2 wherein the first type is isochronous and the second type is asynchronous.

4. The method of claim 1 further comprising receiving a second memory access request of the first type at the first request queue; and processing the first and second memory access requests in the order they were received.

5. The method of claim 1 further comprising if the first queue includes a second memory access request of a second type ahead of the first memory access request of the first type, promoting the second memory access request to the first type.

6. The method of claim 3 further comprising indicating the memory access request type in the memory access request.

7. The method of claim 2 wherein dynamically raising the priority of the first queue includes dynamically configuring an arbiter.

8. The method of claim 1 further comprising if a third request queue includes a memory access request of the first type, prioritizing the third request queue above the second request queue and equally with the first request queue if the first memory access request is of the first type.

9. A method for processing memory access requests, the method comprising:

dynamically configuring an arbiter to prioritize a first request queue above a second request queue if the first request queue receives a memory access request of a first type; and dynamically configuring the arbiter to prioritize the second request queue before all memory access requests of the first type have been serviced in response to a first predetermined maximum number of memory access requests of the first type being serviced.

10. The method of claim 9 further comprising servicing a second predetermined maximum number of memory access requests of a second type from the second request queue when the second request queue is prioritized, and dynamically reconfiguring the first arbiter to reprioritize the first request queue after the second predetermined maximum number of memory access requests of the second type have been serviced.

11. A method for processing memory requests comprising:

at each arbitration point in a memory request pipe, dynamically prioritizing a first request queue that includes a memory access request of a first type; and dynamically prioritizing a second request queue over the first request queue before all memory access requests of the first type have been processed in response to a predetermined maximum number of requests of the first type being processed.

12. The method of claim 11 further comprising at each point in the request pipe, when all memory access requests of the first type in the prioritized queue have been serviced or the predetermined maximum number of memory access requests corresponding to the arbitration point have been serviced, dynamically prioritizing a request queue that includes a memory access request of a second type.

13. The method of claim 11 wherein the first type is isochronous and the second type is asynchronous.

14. An apparatus comprising:

first and second request queues to receive memory access requests; and a configurable arbiter coupled to the first and second request queues, the configurable arbiter to dynamically raise the priority of the first request queue relative to the priority of the second request queue in response to the first request queue receiving a memory access request of a first type, the configurable arbiter further to dynamically raise the priority of the second request queue relative to the priority of the first request queue before all of the requests of the first type have been serviced in response to a predetermined maximum number of requests of the first type being serviced.

15. The apparatus of claim 14 wherein the first type of memory access request is an isochronous memory access request.

16. The apparatus of claim 14 wherein memory access requests in the first request queue are processed in order.

17. The apparatus of claim 14 wherein the first predetermined maximum number is programmable.

18. The apparatus of claim 15 wherein the configurable arbiter is further to dynamically raise the priority of the first request queue relative to the second request queue after a second predetermined number of requests from the second request queue have been serviced.

19. A memory controller comprising:

a first memory access request queue to temporarily store memory access requests of a first high priority request type;

a second memory access request queue to temporarily store memory access requests of a second lower priority request type; and a first configurable arbiter coupled to the first and second memory access request queues, the first configurable arbiter to dynamically prioritize the first memory access request queue above the second memory access request queue until a first predetermined maximum number of memory access requests of the first type have been serviced.

20. The memory controller of claim 19 wherein the first high priority transaction type is isochronous and the second lower priority request type is asynchronous.

21. The memory controller of claim 20 further comprising a third in-order request queue that receives memory access requests in order from a first bus to be coupled to the memory controller, the first bus receiving memory access requests from the first and second memory access request queues;

a fourth memory access request queue to receive memory access requests from a second bus to be coupled to the memory controller; and a second configurable arbiter coupled to the third and fourth request queues, the second configurable arbiter to prioritize the third in-order request queue over the fourth memory access request queue until a second predetermined maximum number of slices have been serviced from the third in-order request queue.

22. The memory controller of claim 21 wherein the second configurable arbiter is further to change memory access requests of the second type in the third in-order request queue to the first type When a memory access request of the first type is stored in the third in-order request queue.

23. The memory controller of claim 19 wherein the first predetermined number is programmable.

24. A computer system comprising:

a processor bus;

a dynamic random access memory (DRAM);

a memory controller coupled to the processor bus and the DRAM, the memory controller comprising first and second request queues to store memory access requests directed to the DRAM, and a configurable arbiter to dynamically prioritize the first request queue over the second request queue if the first request queue stores a memory access request of a first type, the configurable arbiter further to dynamically prioritize the second request queue over the first request queue before all memory access requests of the first type have been serviced in response to a first predetermined maximum number of memory access requests of the first type being serviced.

25. The computer system of claim 24 wherein the first type is isochronous, the computer system further comprising:
   a first peripheral bus coupled to the first request queue to communicate isochronous memory access requests, and
   a second peripheral bus coupled to the second request queue to communicate asynchronous memory access requests.

26. The computer system of claim 25 wherein
   the first request queue is an in-order request queue that receives memory access requests in-order from the processor bus, and
   the second request queue is a graphics request queue that receives memory access requests from a graphics bus.

27. The computer system of claim 26 wherein
   the first request queue is further to change a memory access request of a second type stored in the first request queue to a memory access request of the first type when the memory access request of the first type is stored in the first request queue.

28. The computer system of claim 27 wherein, if the first request queue does not include a memory access request of the first type, the configurable arbiter operates according to a static timeslicing approach.

29. The computer system of claim 25 wherein the first predetermined maximum number is programmable.

* * * * *